T. R. TAYLOR.
Horseshoe Machine.
No. 36,041. Patented July 29, 1862.
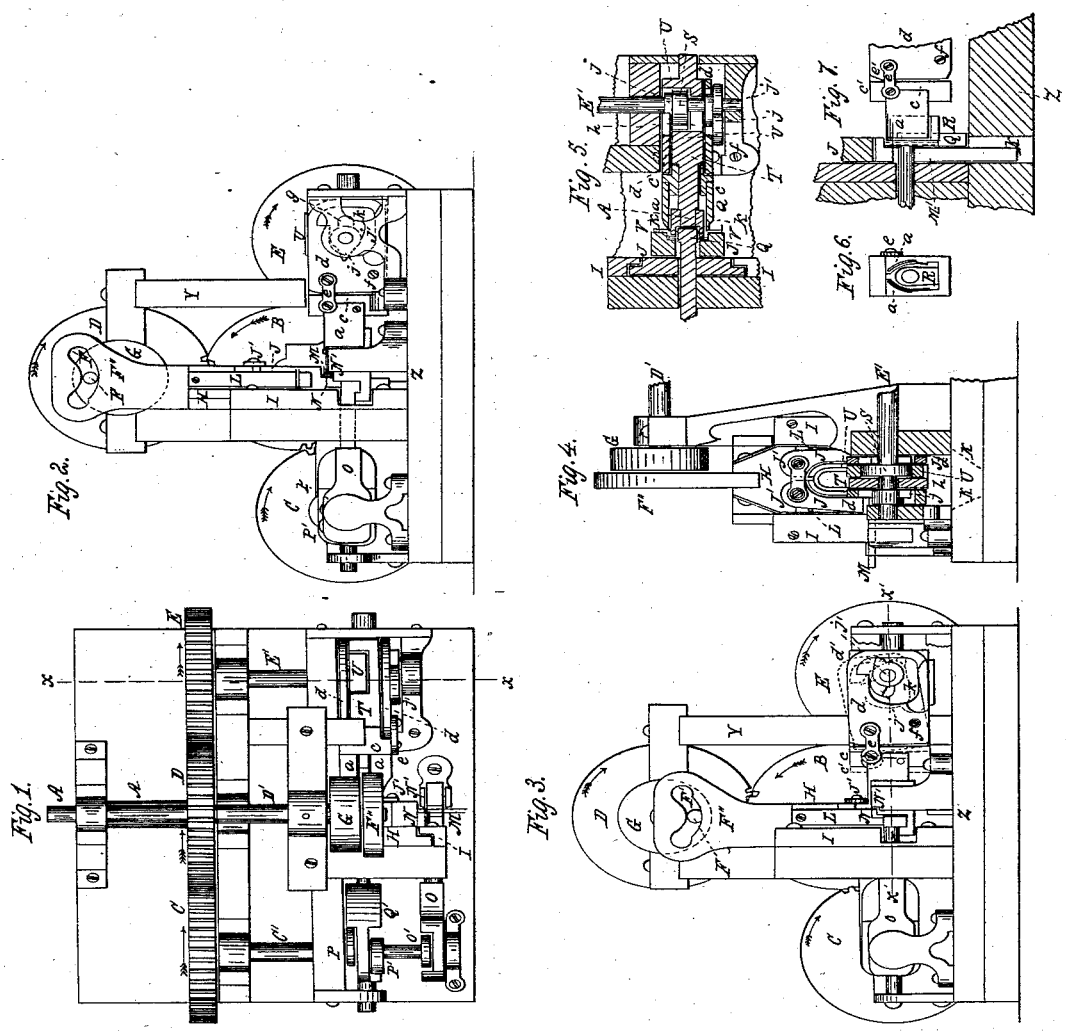
Witnesses:
Inventor:

UNITED STATES PATENT OFFICE.

THOMAS R. TAYLOR, OF CLEVELAND, OHIO.

IMPROVEMENT IN MACHINES FOR MAKING HORSESHOES.

Specification forming part of Letters Patent No. 36,041, dated July 29, 1862.

*To all whom it may concern:*

Be it known that I, THOMAS RANDOLPH TAYLOR, of Cleveland, in the county of Cuyahoga and State of Ohio, have invented new and useful Improvements in Horseshoe-Machines, the same being an improvement on a similar machine for which Letters Patent were granted to me under date of April 3, 1860; and I do hereby declare that the following is a full and complete description of the construction and operation of the same, reference being had to the accompanying drawings, making part of this specification, in which—

Figure 1 is a plan view. Figs. 2 and 3 are side views. Fig. 4 is an end view transversely in the direction of the line $xx$ in Fig. 1. Fig. 5 is a longitudinal section in the direction of the line $x'x'$ in Fig. 3; and Figs. 6 and 7 are detached sections, which will be referred to in the description.

The nature of my improvement relates to the herein-described construction and arrangement of dies and swages, and to the manner of operating the same conjointly by means of cams and levers, as described, for the purpose of forming shoes by one continuous operation of the machine, every complete revolution of the machine being capable of producing one shoe.

Z represents a strong base-plate, from which rise the posts Y, which support the driving and cam shafts and give support to other parts of the machine.

A is the main or driving shaft, to which the motive power is applied, and which shaft is shown in Fig. 1. To this shaft is keyed the driving or intermediate wheel, B. (Shown in Figs. 2 and 3.) The wheel B gears into the wheels C D E upon the shafts C' D' E', and from which these wheels and their respective shafts receive their motion, and, there being the same number of teeth in each, their periods of revolution are the same.

The crank G is secured to the shaft E', and the wrist F of the crank G works in the curved slot F' in the head F''. This head is connected to the slide H, which works in the guides I I, Figs. 4 and 5. To this slide H is pivoted the jaws J J at J' J', and in such a manner as to allow the jaws to open and close, as hereinafter set forth. The lower ends and outer sides of these jaws are tapering or wedge-shaped, so as to conform to a V-shaped slot in the bed-plate Z, as indicated at K, in Figs. 4 and 5, so that the jaws are caused to close as they are forced downward into the V-shaped slot K by the action of the wrist F of the crank G in the curved slot F'. When the jaws rise, they are opened by the action of two springs, L, which are secured to the outer edges of the slide-piece H, the lower ends of said springs being properly secured to the outside of the jaws.

N, Figs. 1, 2, and 3, represents a cutter operating upon the principle of shears in connection with a stationary cutter, N', the cutter N being so connected to the cam-bar O as to be so operated by the cam O' as to cut from the heated bar M the shoe-pattern just as the jaws J J begin to descend.

By the action of the cam P, Fig. 1, on the shaft C' the shoe-shaped mandrel Q, which is upon the cam-bar Q', is moved forward under and between the jaws J J, and enters a recess in the die R, Fig. 7. The shoe-pattern which has been cut from the bar M is clasped by the jaws as they descend, and is compressed or bent around the mandrel Q. In this position, as soon as the iron is thus compressed around the mandrel Q, as seen at M', Fig. 7, the die R is moved to the position seen in Fig. 5 by the cam S, which is situated upon the shaft E', and thus moves the arm T, and with it the die R, as described, thus pressing the shoe V into its proper form, as indicated in Fig. 5. As soon as the die R acts upon the shoe in the jaws, the swages $a\ a$ are impressed into the shoe, making the crease while in the jaws. As soon as the crease is made, the swages $a\ a$ and die R are withdrawn by the action of the cam S, and at the same time the mandrel Q is drawn back by the cam P', and as the mandrel is moving back between the jaws, which still maintain their position, the formed shoe is forced off the mandrel and falls to the ground. By the action of the springs L L the jaws J J, when they rise, are opened sufficiently to allow the mandrel to pass back behind the jaws; but the jaws do not open to their full extent till after the shoe is shoved off the mandrel.

The swages $a\ a$ fit closely to the die R, as seen in Figs. 6 and 7, and are connected to the stock $c$, which is so fitted as to slide upon the arm T. This stock c is also connected to the cam-levers d d by a link, as seen at e, which may be on one only or on both of the levers d d, and which are pivoted to the arm T at f f, which forms their fulcrum.

In each cam-lever is an elongated slot, (indicated at g, Fig. 2,) and one also in the arm T, (seen at h, Fig. 5,) and through these slots the shaft E' passes. This shaft E' is, as are also the others, provided with suitable bearings and boxes. Upon this shaft E' is secured three cams, j, j, and j', besides the cam S, which, as before stated, carries forward and backward the die R and the swages a a at the same time.

The cam S works in the sliding box U, which is made to fit easily in the arm T, so as to accommodate the revolution of the cam S, while a reciprocating movement only is communicated to the arm T, die R, and swages a a. When the die R is moved forward to press the shoe after it has been clasped and still held by the jaws, the swages a a are also carried along at the same time in consequence of their connection to the stock c by the link e and the connection of the stock c with the arm T, which passes through it, and resting against a shoulder, as seen in Fig. 5. The pressure of the die R increases upon the shoe V until the axis of the cam S is passed; but at the moment of extreme pressure upon the shoe the cams j j raise the cam levers d from d to d', Fig. 3, and as they are pivoted at f the upward and forward corner, e', presses against the stock c, moving it from c to c', and thus forcing the swages a a into the shoe, forming thereby the crease. The position of the cam-levers and stock when the shoe is being creased is indicated by the dotted lines in Fig. 3. As the cams revolve, the cam j' acts upon the lower side of the cam-lever, moving it back from d' to d, and at the same time, by the action of the cam S, the die R, the swages a a, and cam-levers d are moved back to the position seen in Fig. 2. At the same time the mandrel Q is drawn back to remove the shoe, and the jaws J J are raised by the wrist F working in the slot F', and opened by the springs L.

In each cam-lever d is arranged a cam-slot, corresponding to k in Figs. 2 and 3, in which revolve the cams j j, and in raising the levers d the cams act upon the upper side of the slot and force forward the swages, as before described, and in depressing the levers they act upon the lower side and draw back the swages to the position seen in Fig. 5.

The mandrel Q, the jaws J J, the die R, and the swages a can all be changed for the making of different-sized shoes.

What I claim as my improvement, and desire to secure by Letters Patent, is—

1. The combination of the reciprocating die R and swages a a, arranged and operating conjointly in the manner and for the purpose specified.

2. The cam-levers d d, pivoted to the arm T, in combination with the swages a a, arranged and operating as and for the purpose set forth.

3. The cams j, j, and j' and cam-slot k, in combination with the cam S, slide U, and arm T, arranged and operating as and for the purpose described.

THOS. R. TAYLOR.

Witnesses:
W. H. BURRIDGE,
HENRY VOTH.